US012069319B2

(12) United States Patent
Varekamp

(10) Patent No.: US 12,069,319 B2
(45) Date of Patent: Aug. 20, 2024

(54) IMAGE SYNTHESIS

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 224 days.

(21) Appl. No.: 17/279,111

(22) PCT Filed: Sep. 16, 2019

(86) PCT No.: PCT/EP2019/074617
§ 371 (c)(1),
(2) Date: Mar. 24, 2021

(87) PCT Pub. No.: WO2020/064381
PCT Pub. Date: Apr. 2, 2020

(65) Prior Publication Data
US 2021/0400314 A1 Dec. 23, 2021

(30) Foreign Application Priority Data

Sep. 25, 2018 (EP) .................................. 18196617

(51) Int. Cl.
*H04N 21/231* (2011.01)
*G06T 15/20* (2011.01)
(Continued)

(52) U.S. Cl.
CPC ......... *H04N 21/231* (2013.01); *G06T 15/205* (2013.01); *H04N 13/117* (2018.05);
(Continued)

(58) Field of Classification Search
CPC ............. H04N 21/231; H04N 21/6587; H04N 21/816; H04N 21/21805; H04N 13/194;
(Continued)

(56) References Cited

U.S. PATENT DOCUMENTS 9,438,879 B2 9/2016 Newton et al.
10,021,377 B2 7/2018 Newton et al.
(Continued)

FOREIGN PATENT DOCUMENTS

WO 2018104102 A1 6/2018

OTHER PUBLICATIONS

International Search Report and Written Opinion From PCT/EP2019/074517 Mailed Nov. 13, 2019.

*Primary Examiner* — Oschta I Montoya

(57) ABSTRACT

An image synthesis apparatus comprises a receiver (301) for receiving image parts and associated depth data of images representing a scene from different view poses from an image source. A store (311) stores a depth transition metric for each image part of a set of image parts where the depth transition metric for an image part is indicative of a direction of a depth transition in the image part. A determiner (305) determines a rendering view pose and an image synthesizer (303) synthesizes at least one image from received image part. A selector is arranged to select a first image part of the set of image parts in response to the depth transition metric and a retriever (309) retrieves the first image part from the image source. The synthesis of an image part for the rendering view pose is based on the first image part.

20 Claims, 9 Drawing Sheets

(51) Int. Cl.
*H04N 13/117* (2018.01)
*H04N 13/194* (2018.01)
*H04N 13/344* (2018.01)
*H04N 13/383* (2018.01)
*H04N 21/218* (2011.01)
*H04N 21/6587* (2011.01)
*H04N 21/81* (2011.01)

(52) U.S. Cl.
CPC ......... *H04N 13/194* (2018.05); *H04N 13/344* (2018.05); *H04N 13/383* (2018.05); *H04N 21/21805* (2013.01); *H04N 21/6587* (2013.01); *H04N 21/816* (2013.01)

(58) Field of Classification Search
CPC .. H04N 13/344; H04N 13/383; H04N 13/117; H04N 2213/003; G06T 15/205
See application file for complete search history.

(56) References Cited

U.S. PATENT DOCUMENTS

| | | |
|---|---|---|
| 10,521,309 B1 | 12/2019 | Takahashi et al. |
| 2012/0068996 A1* | 3/2012 | Berestov ............... G06T 15/005 |
| | | 345/419 |
| 2012/0188234 A1* | 7/2012 | Ortega ................... G06T 15/20 |
| | | 345/419 |
| 2013/0009950 A1 | 1/2013 | Ben-David et al. |
| 2016/0225157 A1 | 8/2016 | Yuan et al. |
| 2017/0018055 A1* | 1/2017 | Holzer ................... G06T 11/60 |
| 2017/0118458 A1 | 4/2017 | Gronholm et al. |
| 2018/0007395 A1 | 1/2018 | Ugur et al. |
| 2018/0295340 A1 | 10/2018 | Varekamp et al. |
| 2019/0273902 A1 | 9/2019 | Varekamp et al. |
| 2019/0385352 A1 | 12/2019 | Varekamp |
| 2020/0413097 A1 | 12/2020 | Kroon |

* cited by examiner

IMAGE SYNTHESIS

CROSS-REFERENCE TO PRIOR APPLICATIONS

This application is the U.S. National Phase application under 35 U.S.C. § 371 of International Application No. PCT/EP2019/074617, filed on Sep. 16, 2019, which claims the benefit of EP Patent Application No. EP 18196617.7, filed on Sep. 25, 2018. These applications are hereby incorporated by reference herein.

FIELD OF THE INVENTION

The invention relates to image synthesis and generation of an image data stream therefor, and in particular, but not exclusively, to image synthesis based on image parts of images for e.g. virtual reality applications and services.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction (the viewing pose) of the viewer, such as for example allowing the viewer to move and "look around" in the scene being presented.

Such a feature can specifically enable a virtual reality experience being provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications for computers and consoles, such as in the game category of first person shooters.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

A major issue in supporting various services based on, in particular three dimensional, representations of a scene is that a large amount of data is required. This results in high resource requirements, such as a need for large storage resources. However, in many scenarios, the biggest constraint is not storage or processing requirements but communication requirements. If it is required that the data representing the scene must be communicated over a bandwidth limited communication channel (whether internal or external), it is highly desirable to try to reduce the amount of data that needs to be communicated.

For example, in many scenarios and for many applications, a client server approach may be used wherein a remote client executing e.g. a virtual reality application is coupled to a central service that provides the required scene data over a bandwidth limited link. A multi-view representation will however typically be associated with a high bitrate (even without depth information a high bitrate is required, and indeed this may often be even higher in this case as more views will be needed). For instance, virtual reality playback with motion freedom will require different views of a scene at the speed that the observer is moving through 3D space. The challenge of providing sufficient data over such a communication channel is very difficult to address in practice.

Several formats have been proposed for efficient streaming of 3D geometry and texture information over bandwidth limited communication channels, and especially for use with networks, such as the Internet. For example, the MPEG Omnidirectional MediA Format (OMAF) standard will include tiled streaming of 360 video (3 Degrees of Freedom (DoF))) which makes use of Dynamic Adaptive Streaming over HTTP (MPEG DASH). A future version of OMAF is expected to support limited motion parallax (3DoF+).

As mentioned, in practice, the most urgent problem in multi-view with depth coding is often not the storage requirement but rather the transmission bandwidth and latency. In order to have a smooth experience, images should arrive in time at the headset. However, although the developed formats and encodings seek to reduce the data rate, it is still typically the main limitation on the quality and user experience that can be achieved at the client side.

Furthermore, in order to maintain a sufficiently high quality of the generated images, it is important that appropriate data is available for the view synthesis. In particular, synthesizing an image from a different viewpoint causes a parallax shift which is dependent on the depth of the object. Accordingly, the shift may cause de-occlusion which may reveal holes in the image which must be filled in by data from other viewpoints or by extrapolation which however tends to be suboptimal. Thus, there is critical trade-off between the data rate required and the amount of data provided to the synthesizer.

Hence, an improved approach for generating and using image data streams would be advantageous. In particular, an approach that allows improved operation, facilitated operation, improved representation of a scene, increased flexibility, facilitated implementation, facilitated operation, reduced data rate, reduced data storage, distribution, and/or processing resource requirements, improved adaptability, improved image quality, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an image synthesis apparatus, the image synthesis apparatus comprising: a receiver for receiving received image parts and associated depth data, the image parts being parts of images representing a scene from different view poses from an image source; a determiner for determining a rendering view pose; a store comprising a depth transition metric for each image part of a set of image parts of the received image parts, the depth transition metric for an image part being indicative of a direction of a depth transition in the image part; a selector for selecting a first image part of the set of image parts in response to the rendering view pose and the depth transition metric; and a retriever for retrieving the first image part from the image source; an image synthesizer for synthesizing at least one image from received image parts including the first image part.

The invention may provide improved operation and/or performance for an image synthesis and distribution system, such as for example in a free viewpoint video system. The approach may provide particularly advantageous performance for a virtual/artificial/augmented reality experience where views are adapted. The approach may provide for a reduced complexity in many scenarios. It may in many scenarios provide a substantially reduced data rate for the bitstream and/or an improved quality. An improved quality/data rate trade-off can be achieved in many scenarios.

In many embodiments, the approach may in particular reduce or mitigate deo-occlusion errors and artefacts occurring from the image synthesis.

The associated depth data for an image part may be depth data which indicates distances from a view point for the image part to objects in the image part.

The image synthesizer may be arranged to synthesize an image region/part of a synthesized image from the first image part. The synthesis may include a view pose shift from the view pose of the first image part to the rendering view pose.

The depth transition metric for the image part may be indicative of a direction of the depth transition in an image plane, which specifically may be the image plane (or a parallel plane) of the image part/the image of the image part. The direction may be an image plane direction of a transition from further forwards to further backwards (from foreground towards background), or may e.g. be an image plane direction of a transition from further backwards to further forwards (from background towards foreground).

The image source may be a remote source, such as remote server. An image for a view pose may typically be divided into a plurality of image parts but one or more images may be divided into a single image part, i.e. an image part may correspond to an entire image for a view pose.

The set of image parts are a set of the image parts received by the receiver and may be a complete set or a subset thereof.

The step transition may be a dominant or largest transition of depth in the image part.

In some embodiments, the selector may further be arranged to select the second subset of image parts in response to a visibility measure for the set of image parts for a target view pose.

In some embodiments, the image parts are pre-encoded image parts.

In some embodiments, the set of image parts comprises faces of polyhedral projections of the scene for different view poses.

In some embodiments, the image parts correspond to a predetermined partitioning of the images.

In some embodiments, the apparatus further comprises a partitioner for generating at least some image parts of the set of image parts in response to a partitioning of images based on at least one of pixel values of the images and depth values for the images. In some embodiments, at least some image parts are overlapping.

In accordance with an optional feature of the invention, the depth transition metric is indicative of a size of the depth transition.

This may provide an improved performance in many embodiments. The size of the depth transition may e.g. be an absolute value of a depth step or a magnitude of a depth gradient or depth gradient vector.

In accordance with an optional feature of the invention, the selector is arranged to further select the first image part in response to differences between a view pose of the image parts of the set of image parts and the rendering view pose.

This may further improve performance and may e.g. reduce errors or artefacts resulting from large view shift operations.

In accordance with an optional feature of the invention, the selector is arranged to determine the set of image parts subject to a constraint that a difference between the view pose of any image part belonging to the set of image parts and the rendering view pose is below a threshold.

This may further improve performance while maintaining low complexity and resource requirements.

In accordance with an optional feature of the invention, the selector is arranged to determine the set of image parts as image parts representing a same region of the scene as an image section of an image to be synthesized by the image synthesizer, the image parts of the set of image parts representing the image region from different view poses.

The approach may provide improved synthesis of images and may in particular in many scenarios reduce errors and artefacts occurring from de-occlusion.

In accordance with an optional feature of the invention, the set of image parts comprises image parts from different view poses and corresponding to a same part of an image to be synthesized.

The approach may provide improved synthesis of images and may in particular in many scenarios reduce errors and artefacts occurring from de-occlusion.

In accordance with an optional feature of the invention, the selector is arranged to bias selection of the first image part towards an image part for which a front to back depth transition of the depth transition is in a direction that is opposite to a direction from a view pose for the image part to the rendering view pose.

This may provide particularly efficient performance and may in many scenarios provide a particularly efficient approach for reducing errors and artefacts occurring from de-occlusion when performing view pose shifts.

The directions may be image plane directions and specifically may be image plane directions in the image plane (or a parallel plane) of the image part/the image of the image part. The direction of a front to back depth transition of an image part may be a direction in the image plane of a transition from a more foreground object/area/pixel to a more background object/area/pixel. The direction from a view pose for the image part to the rendering view pose may be a direction in the image plane of the image part/image. It may be a direction from a projection of the view pose to the image plane along a direction orthogonal to the image plane to a projection of the rendering view pose to the image plane along a direction orthogonal to the image plane. The bias may be dependent on a degree of correlation/alginment between the directions in the image plane.

It will be appreciated that directions and points in the image plane need not explicitly be calculated or determined in order to perform the bias.

The selector may be arranged to bias the selection by performing the selection in response to a cost function that has an increasing value for an increasing alignment between the directions of the front to back transition and of the view pose to rendering view pose difference (e.g. in the image plane).

In accordance with an optional feature of the invention, the synthesis of the at least one image comprises synthesizing an image part of the at least one image from the first image part.

The approach may provide improved synthesis of images for different rendering view poses.

In accordance with an optional feature of the invention, the depth transition metric represents an average of depth gradients exceeding a threshold.

This may provide particularly advantageous performance in many embodiments.

According to an aspect of the invention there is provided an apparatus for generating an image data stream, the apparatus comprising: a receiver for receiving an image part request from a remote source; a store for storing a set of image parts and associated depth data, the image parts being parts of images representing a scene from different view poses; a metric generator for providing a depth transition metric for each image part of the set of image parts, the depth transition metric for an image part being indicative of a direction of a depth transition in the image part; a selector for selecting image parts from the set of image parts in response to the image part request and the depth transition metrics; and a transmitter for transmitting selected image parts and associated depth to the remote source.

In accordance with an optional feature of the invention, the transmitter is arranged to transmit the depth transition metrics for the set of image parts to the remote source.

In accordance with an optional feature of the invention, the image part request comprises a view pose indication, and the selector is arranged to select image parts in response to the depth transition metrics and the view pose indication.

According to an aspect of the invention there is provided a method of synthesizing an image, the method comprising: receiving received image parts and associated depth data, the image parts being parts of images representing a scene from different view poses from an image source; determining a rendering view pose; storing a depth transition metric for each image part of a set of image parts of the received image parts, the depth transition metric for an image part being indicative of a direction of a depth transition in the image part; selecting a first image part of the set of image parts in response to the rendering view pose and the depth transition metric; retrieving the first image part from the image source; and synthesizing at least one image from received image parts including the first image part.

According to an aspect of the invention there is provided a method of generating an image data stream, the method comprising: receiving an image part request from a remote source; storing a set of image parts and associated depth data, the image parts being parts of images representing a scene from different view poses; providing a depth transition metric for each image part of the set of image parts, the depth transition metric for an image part being indicative of a direction of a depth transition in the image part; selecting image parts from the set of image parts in response to the image part request and the depth transition metrics; and transmitting selected image parts and associated depth to the remote source.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to image synthesis and generation of an image data stream for a virtual reality application. However, it will be appreciated that the invention is not limited to this application but may be applied in e.g. many different image processing and rendering applications.

Figure 1:
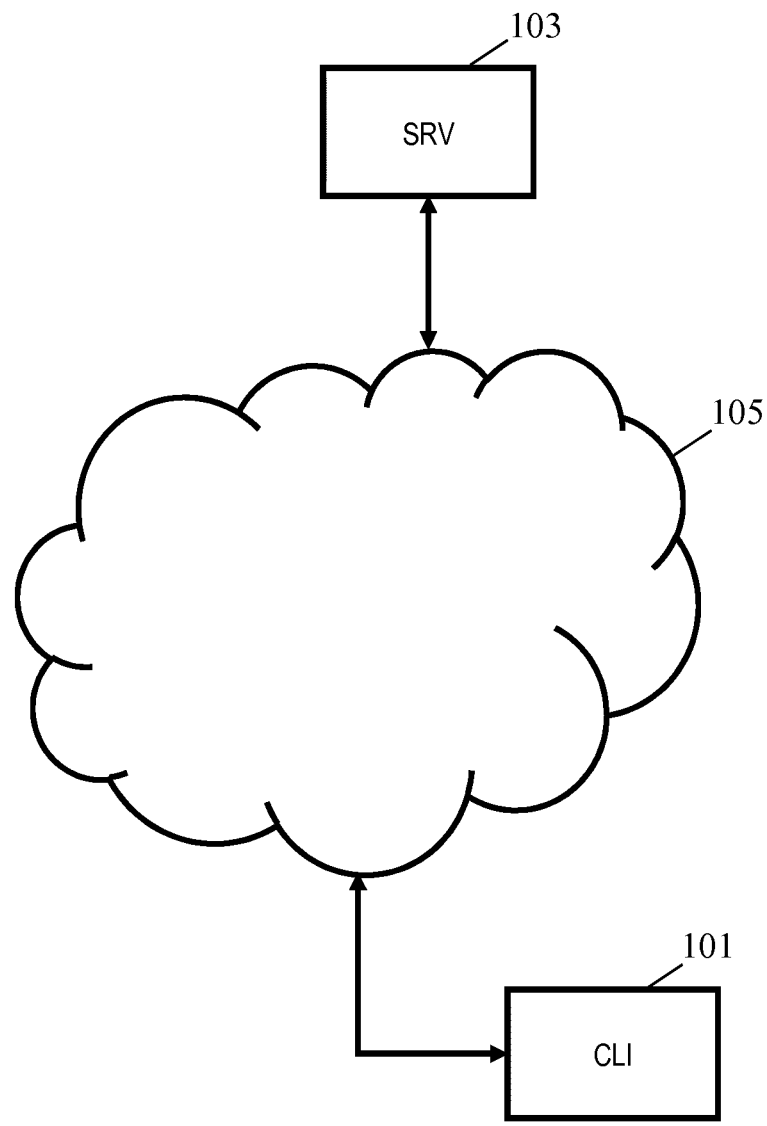
FIG. 1 illustrates an example of elements of an image processing system in accordance with some embodiments of the invention.

FIG. 1 illustrates an example of a system that may embody examples and variants of embodiments of the inventive concept.

In the example, a client in the form of an image synthesis apparatus 101 is arranged to generate images representing a scene from different viewpoints, i.e. images corresponding to different viewports for different view poses of the scene may be generated. The image synthesis apparatus 101 is arranged to receive an image data stream which comprises image parts as well as associated depth thereby providing a partial three-dimensional image representation of a scene. It may then, based on the received data, generate the appropriate images corresponding to the given viewport and pose. In the example, the image data stream is received from an image data stream generating apparatus 103 which operates as a remote server. The image data stream generating apparatus 103 is arranged to provide the image data stream via a network 105 which may for example be the Internet. The arrangement may correspond to a client server arrangement and accordingly the image synthesis apparatus 101 will also be referred to as the client and the data stream generating apparatus 103 will also be referred to as the server.

In the specific example, the image data stream generating apparatus 103 is a virtual reality server which provides three-dimensional image data representing a three-dimensional environment for the image synthesis apparatus 101 to generate views corresponding e.g. to a virtual user's movement in the environment.

In the field, the terms placement or a pose is used as a common term for position and/or direction/orientation and the combination of the position and direction/orientation of e.g. an object, a camera, or a view is indeed typically referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following the term pose is used to refer to a position and/or orientation which may be represented by one to six values (corresponding to the maximum possible degrees of freedom). The description will focus on embodiments and examples where a pose has the maximum degrees of freedom, i.e. three degrees of freedom of each of the position and the orientation resulting in a total of six degrees of freedom (6DoF). The pose may thus be represented by a set or vector of six values representing the six degrees of freedom and thus the pose vector may provide a three-dimensional position and/or a three-dimensional direction indication. However, it will be appreciated that in other embodiments, the pose may be represented by fewer values.

In many applications, the three-dimensional image representation of the scene present at the server may be generated from a capture of a real-world scene or environment using e.g. depth sensing cameras. This allows for visual properties to be captured together with three-dimensional information. In order to capture a scene sufficiently, the use of an often very high number of captures corresponding to different view poses is adopted. In some applications, several 100s or even 1000s of images (with associated depth information) may be used to provide an accurate and detailed representation of the entire scene from different view poses.

The virtual data representation of a scene is a critical factor in providing an advantageous user experience. It is required that the data describing the scene provides an accurate representation of both the visual properties as well as the spatial properties. At the same time, it is critical to reduce the amount of data needed to represent the scene as this in many applications tends to be a limiting factor for the quality that can be achieved.

In particular, it is required that sufficient information is provided to the image synthesis apparatus 101 to allow it to locally generate suitable images corresponding to the desired view poses, e.g. by performing view point shifting as will be known to the person skilled in the art. However, at the same time, it is required that the amount of data transmitted is kept low and that latency is kept to a minimum as far as possible. In many scenarios, the limited communication bandwidth is the restrictive factor in seeking to provide a high quality user experience with high quality and low latency.

In addition, the conversion from the captures of the depth sensing cameras to a data representation of the environment/scene is often very challenging and may introduce errors or artefacts. For example, in some applications, the captured data may be used to develop a three-dimensional model of the real-world scene. View images for a user being provided with a three-dimensional virtual reality experience may then be generated by evaluating the model from a specific viewpoint. In other applications, images for specific viewports or viewpoints may directly be generated from the captured images and depth information, e.g. by selecting one or more of the closest captured images and performing viewpoint shifting to correspond to the desired viewpoint, or in some cases by directly using the captured images.

In the present case, the scene is represented in the image domain by a set of images together with depth data. In many embodiments, the images may provide visual information reflecting the view of a given view pose and the depth data may represent the depth of pixels or objects in the image. Specifically, each image may correspond to a given capture for a given view pose for the scene with the depth data being an accompanying depth map as will be known to a skilled person. In some embodiments, the images may e.g. be texture atlas images or texture maps, and the depth data may be meshes providing a mesh and texture representation of the scene, as will be described in more detail later.

The image data stream generating apparatus 103 may accordingly comprise images and associated depth data representing the scene from a set of view poses, and specifically the images and depth data may be captured data. The image data stream generating apparatus 103 accordingly stores a representation of the 3D scene by a set of images with depth for a discrete set of view poses. The view poses for which such images are available will also be referred to as reference or anchor view poses and the images will be referred to as reference or anchor view images. In systems where the scene is described/referenced by view data stored for discrete reference viewpoints/positions/poses, these are in the field also referred to as anchor viewpoints/positions/poses and in the following the terms reference and anchor will be used as equivalent/identical. Typically, when a real world environment has been captured by capturing images from different points/positions/poses, these capture points/positions/poses are also the reference/anchor points/positions/poses.

The reference/anchor view images may in some embodiments e.g. be full semi-spherical images covering e.g. 360° azimuth range and a 180° elevation range. In other embodiments, the anchor images may cover smaller viewing angles such as for example e.g. a 360° or 180° azimuth range with a 40° elevation range.

The anchor images may further be divided into image parts and typically the image data stream generating apparatus 103 may store a large set of such anchor image parts for the anchor poses. In some embodiments, the image parts may be generated by (actively) segmenting or dividing anchor images. In other embodiments, an image part may e.g. comprise all data available for a given anchor pose, i.e. the image part may be the entire image for a given anchor pose. The image parts may specifically be generated by tiling of the anchor view images. Alternatively, overlapping image parts may be used.

The image parts may often still be relatively large and for example the anchor images may be divided into between 4 and 20 smaller image parts/tiles. For example, each image part may have a 60° azimuth angle and a 22.5° elevation angle.

The image data stream generating apparatus 103 accordingly comprises a (potentially partial but often substantially complete) three-dimensional image representation of the scene by a set of image parts and associated depth maps. The image data stream generating apparatus 103 may provide relevant data to the image synthesis apparatus 101 allowing this to locally synthesize images from a desired rendering view pose which may typically differ from the anchor/reference view pose. Further, the system may support a flexible and dynamic operation where relevant image data is continuously transmitted to the image synthesis apparatus 101 such that it can perform the synthesis. Thus, the image data stream generating apparatus 103 does not merely transmit all the stored data to the image synthesis apparatus 101 for processing. Such an approach would be impractical as it would require an extremely high amount of data to be communicated and stored which is not feasible in most applications. It would furthermore not be suited for dynamic scenes where the scene may change.

The image data stream generating apparatus 103 may specifically receive a request for data from the image synthesis apparatus 101, e.g. in the form of the image synthesis apparatus 101 providing a view pose indication for the synthesis to be performed. As the request changes, e.g. due to the user moving his head to look around, new image data is required and this is transmitted from the image data stream generating apparatus 103 to the image synthesis apparatus 101 to allow this to synthesize the required views. Thus a continuous image data stream may be generated by the image data stream generating apparatus 103 and transmitted to the image synthesis apparatus 101.

However, rather than transmitting whole anchor images, the approach of FIG. 1 is based on the data stream being a stream of image parts. Specifically, the image data stream generating apparatus 103 may transmit appropriate image parts to the image synthesis apparatus 101 when required for synthesis. The approach may reduce data rate requirements as only required image parts need to be transmitted. At the same time, the image parts may be sufficiently large to provide efficient administration and coding etc.

However, a critical issue for such a system is to select and prioritize which image parts are transmitted to the image synthesis apparatus 101 from the image data stream generating apparatus 103.

For each light intensity/texture image part, the image data stream generating apparatus 103 stores an associated depth map providing depth information for the pixels of the light intensity/texture image parts. The depth map may typically comprise depth values that are indicative of the distance from a given view position to the object at the viewing direction corresponding to the position of the depth value. A depth value may e.g. have an increasing value for an increasing distance from the viewpoint to the object or may have a decreasing value for an increasing distance from the viewpoint to the object. The depth values may in many embodiments be provided as disparity values.

The provision of both depth and image (texture) information may provide additional information allowing improved processing by the image synthesis apparatus 101. In particular, it may allow, or facilitate or improve, generation of view images for other view poses than the anchor view poses.

In order to facilitate such processing, it is desired that the distance between view poses is as small as possible. Specifically, a large spacing between anchor poses results in visible de-occlusion areas and requires very accurate depth maps or mesh models for the synthesis of intermediate views. A render unit can fill in the de-occlusion areas by combining multiple anchors, but this requires more resources for transmission, decoding and rendering and tends to reduce quality.

However, a small spacing between anchors leads to an increase in bitrate which typically is particularly high for applications such as Virtual Reality applications allowing free movement. The reason for this is that (in contrast to normal video), a light field with depth varies as a function of three spatial dimensions. This means that the coding cost of fixed elements (not residue) is high due to the high-dimensionality of the data.

In the following an approach will be described which may provide improved performance in many scenarios, and which specifically may mitigate or reduce occlusion errors and artefacts while still maintaining a low data rate and complexity. It may implement a flexible and efficient system. The approach is based on considering specific depth aspects when determining which image parts should be transmitted to the image synthesis apparatus 101 and used for the synthesis. Specifically, the Inventor has realized that by considering a depth transition metric which is indicative of a direction and typically a size of a depth transition in the image part, it is possible to provide an improved selection which in many scenarios may provide improved performance and image quality, and which specifically may improve and reduce artefacts caused by de-occlusion.

The depth transition metric for the image part may be indicative of a direction of the depth transition in an image plane, which specifically may be the image plane (or a parallel plane) of the image part/the image of the image part.

The approach will first be described with respect to an embodiment in which the image data stream generating apparatus 103 may be a relatively low complexity and "dumb" server in the sense that much of the decision on which image part(s) to transmit is made by image synthesis apparatus 101. Specifically, the image synthesis apparatus 101 may simply (iteratively) request specific image parts and the image data stream generating apparatus 103 may simply provide the requested image part.

In such an embodiment the image data stream generating apparatus 103 may comprise a store 201 which is arranged to store a set of image parts (also referred to as anchor or reference image parts) and associated depth data of images representing a scene from different view poses. For example, the store 201 may comprise tiles of a number of different anchor images for different anchor poses.

The image data stream generating apparatus 103 may further comprise a request receiver 203 which is arranged to receive an image part request from a remote source which in the specific example is the image synthesis apparatus 101. In the example, each received image part request may request a specific image part to be transmitted to the image synthesis apparatus 101. For example, the image part request may identify a specific tile of a specific anchor image.

The request receiver 203 is coupled to a selector 205 which is further coupled to the store 201. The selector 205 may in response to the image part request select the corresponding image part and retrieve it from the store 201. For example, the selector 209 may comprise a look-up-table which converts the identification of the image part request to the appropriate location in the store 201 and it may then retrieve the data at that location.

The selector 205 is further coupled to a transmitter 207 which is fed the retrieved image part. The transmitter 207 is arranged to transmit the retrieved image part to the image synthesis apparatus 101. Thus, in response to receiving an image part request requesting a specific image part, the image data stream generating apparatus 103 retrieves the requested image part and transmits it back to the image data stream generating apparatus 103. The transmission of an image part further includes the transmission of the associated depth data for the image part.

In addition, the image data stream generating apparatus 103 comprises a metric processor 209 which is arranged to generate depth transition metrics for the image parts stored in the store 201. Thus, for each image part of a set of image parts (which typically but not necessarily includes all the stored image parts) a depth transition metric is determined. The depth transition metric for an image part is a metric which at least indicates a direction of a depth transition in the image part, and typically also a size of the depth transition. The depth transition may typically be the largest depth transition to occur in the image.

For example, the depth transition metric may for an image part be generated to indicate the direction of the largest depth transition from the front to the back. The depth transition metric may specifically indicate whether this occurs in the direction from right to left or from left to right. Thus, in many embodiments, the direction indication of the depth transition metric may be a one dimensional direction, and may specifically be a horizontal direction. This will in many embodiments be a particularly advantageous approach as view shifting in most embodiments is in the horizontal direction (reflecting the horizontal configuration of the eyes of a human and that the view height is typically unchanged).

In many embodiments, the metric processor 209 also determines the size of the depth transition and specifically may determine the depth gradient for the step.

As a specific example, the metric processor 209 may, on the basis of the depth map for an image part, divide the image part into different segments having substantially the same depth values. In some embodiments, this segmentation may further take visual considerations into account, e.g. by the segment borders being determined to ensure that regions within the segment has substantially the same visual properties (e.g. the same texture or color).

The metric processor 209 may then for each point (e.g. pixel) of a border between two segments determine the depth gradient, including both the size and direction of the gradient. For example, the depth step between a depth average for a small group of pixels to the left of the border and a small group of pixels to the right of the border may be determined and used as a depth gradient with the sign indicating the direction. The resulting depth gradients may then be low-pass filtered by a suitable spatial low pass filter and the maximum filtered depth gradient may be identified and used as the depth transition metric for that image part. Thus, a single value is generated which is indicative of the property of a depth transition in the image part. In some embodiments, the depth transition metric may be a single bit indicating the direction of the depth transition metric in the horizontal direction. E.g. only the determined sign bit may be used.

In many embodiments, the depth transition metric may be determined to reflect a gradient vector that is representative of the most dominant depth step present in the depth map for the image part.

As an example, the depth transition metric may be determined to represent an average of depth gradients exceeding a threshold. The depth transition metric may be determined by determining the average of the subset of pixels for which the depth gradient magnitude exceeds a give threshold. For example, the metric processor 209 may for all pixels in the image part determine a depth gradient, e.g. as the depth value of a group of pixels to the left of the current pixel minus the depth value of a group of pixels to the right of the current pixel. It may then (possibly after a spatial low pass filtering) proceed to reject all gradient values below a given threshold and determine the depth transition metric as the average of the remaining gradient values.

In case a triangular mesh representation is used, the depth transition metric may be determined by analyzing the different in 3D position between adjacent vertices in triangular mesh. A suitable depth transition metric could be the maximum 3D distance that occurs between any two connected vertices in the mesh.

It will be appreciated that the metric processor 209 may determine the depth transition metric at any suitable time, such as specifically when the anchor images are received. It will also be appreciated that in some embodiments, the metric processor 209 may be arranged to determine the depth transition metrics by retrieving them (actively or passively) from a remote source. For example, depth transition metrics may be determined during content generation and provided to the image data stream generating apparatus 103 together with the anchor images.

In the example, the image data stream generating apparatus 103 is arranged to transmit the depth transition metrics to the image synthesis apparatus 101 which is arranged to use the data when determining which image part to retrieve. As will be described in more detail, in some embodiments, the depth transition metrics may not be transmitted to the image synthesis apparatus 101 but may be used by the image data stream generating apparatus 103 to locally determine which image parts to transmit to the image synthesis apparatus 101.

In the example where the depth transition metrics are transmitted to the image synthesis apparatus 101, this may be done at any suitable time and in any suitable format. For example, in some embodiments, the entire set of depth transition metrics may be transmitted to the image synthesis apparatus 101 during the setup of the service. This may be practical in many embodiments, as the data required to represent the depth transition metric may be quite small. For example, as previously mentioned, a depth transition metric may in many embodiments be represented by a single bit indicating the horizontal direction of the main depth transition in the image part. For a typical implementation employing say, 100 anchor images with each image being divided into, say, 10 image parts, the entire depth transition metric set may be represented by less than 1 kbits. Even for embodiments where the size is included, e.g. by an 8 bit word, the entire depth transition metric set may be represented by less than 1 kbyte of data.

In other embodiments, e.g. when the depth transition metric is represented by long word lengths and there are a very large number of image parts, the image data stream generating apparatus 103 may be arranged to dynamically transmit depth transition metric data to the image synthesis apparatus 101. For example, when a new image part is transmitted to the image synthesis apparatus 101, the image data stream generating apparatus 103 may include the depth transition metric data for all image parts in a neighborhood of the transmitted image part as these are candidates for future selection.

Figure 2:
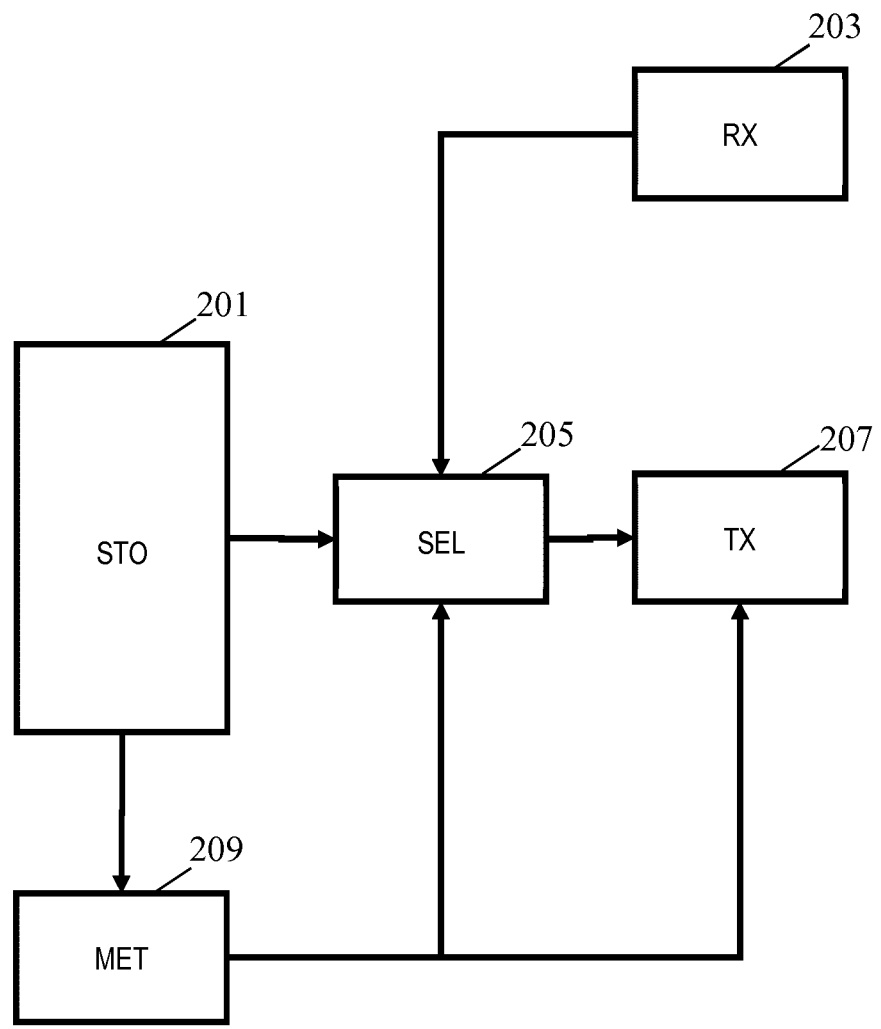
FIG. 2 illustrates an example of elements of an image data stream generating apparatus in accordance with some embodiments of the invention.
Figure 3:
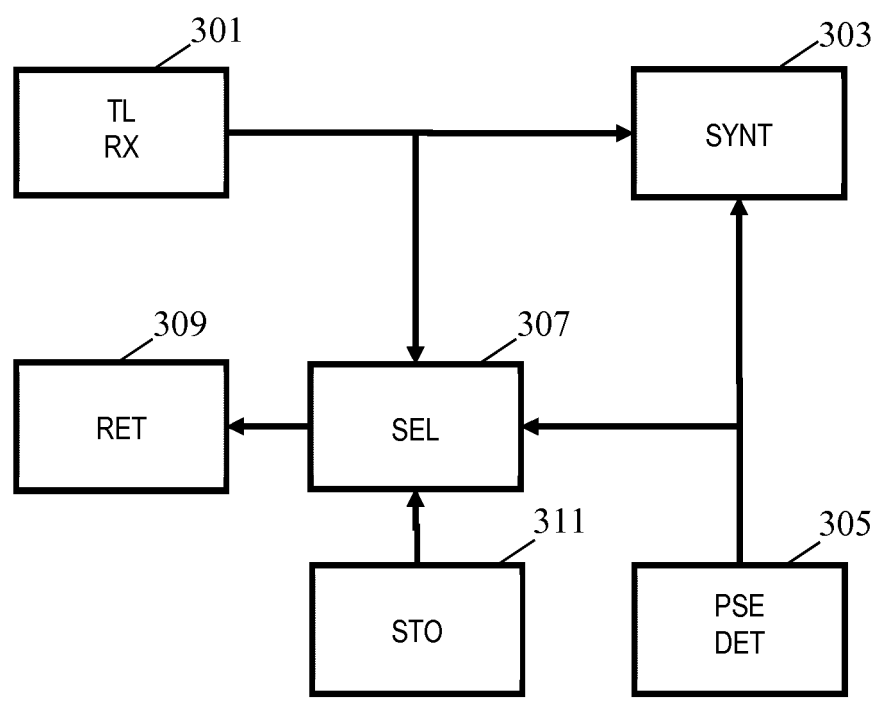
FIG. 3 illustrates an example of scenes and associated prediction quality properties.

FIG. 3 illustrates an example of elements of the image synthesis apparatus 101 in accordance with some embodiments of the invention. The image synthesis apparatus 101 of FIG. 3 may specifically interwork with the image data stream generating apparatus 103 of FIG. 2.

The image synthesis apparatus 101 comprises a data receiver 301 which is arranged to receive the data stream from the image data stream generating apparatus 103. Specifically, the data receiver 301 receives the image parts of the different anchor images as appropriate.

The image synthesis apparatus 101 further comprises an image synthesizer 303 which is fed the image parts received from the image data stream generating apparatus 103. In addition, the image synthesis apparatus 101 comprises a pose determiner 305 which is arranged to determine a rendering view pose from which to render images.

The rendering view pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position of the VR headset.

In some systems, the rendering view pose may be provided by manual means, e.g. by the user manually controlling a joystick or similar manual input. For example, the user may manually move the virtual viewer around in the virtual scene by controlling a first analog joystick with one hand and manually controlling the direction in which the virtual viewer is looking by manually moving a second analog joystick with the other hand.

In some applications a combination of manual and automated approaches may be used to generate the rendering view pose. For example, a headset may track the orientation of the head and the movement/position of the viewer in the scene may be controlled by the user using a joystick.

The rendering view pose is fed to the image synthesizer 303 which is arranged to synthesize an image corresponding to the rendering view pose. The image synthesizer 303 may specifically be arranged to perform viewpoint shifting etc. to synthesize an image from a new viewpoint. It will be appreciated that the skilled person will be aware of many different approaches and algorithms for such view shifting/synthesis and that any suitable approach may be used.

The image synthesizer 303 may specifically be arranged to perform the image synthesis on an image part basis. Specifically, when synthesizing an image, the image synthesizer 303 may divide the image into a plurality of image parts, regions or tiles. For each image part, the image synthesizer 303 may select one or more received image parts and apply a viewpoint shift to the image part(s) to generate the corresponding image part in the synthesized image.

In order to be able to synthesize the required view image for the current rendering view pose, the image synthesis apparatus 101 comprises functionality for retrieving the necessary image parts from the image data stream generating apparatus 103.

Specifically, the image synthesis apparatus 101 comprises a synthesis selector 307 which is arranged to select which image part(s) should be retrieved from the image data stream generating apparatus 103 and used for the synthesis. The synthesis selector 307 is coupled to a retriever 309 which is arranged to retrieve the selected image part(s) from the image data stream generating apparatus 103. The retriever 309 may for example be arranged to transmit an image part request to the image data stream generating apparatus 103 using a suitable message format. For example, the image part request may directly identify the desired image part(s). In response, the image data stream generating apparatus 103 will transmit the requested image part.

The image synthesis apparatus 101 further comprises a metric store 311 which is arranged to store the depth transition metrics received from the image data stream generating apparatus 103. The following description will assume that the depth transition metrics for all possible image parts are stored and available at the image synthesis apparatus 101, e.g. because these have been downloaded at the initialization of the service. The metric store 311 accordingly stores depth transition metrics both for image parts that have been received and more importantly also for image parts that have not been received.

It will be appreciated that in some embodiments, the depth transition metrics may be received during operation and only depth transition metrics for a subset of the image parts may be stored in the metric store 311 at any given time. For example, the depth transition metrics for image parts for image poses in a neighborhood of the image pose of the last requested image part may be transmitted. For example, the image data stream generating apparatus 103 may when receiving a request for an image part also proceed to identify all anchor images/image parts that have an anchor pose that meets a distance criterion. This distance criterion may include the orientation of the requested image part to e.g. only select a subset of image parts for other view positions, but in many embodiments, the image data stream generating apparatus 103 may simply identify the anchor images that have an anchor view pose with a position sufficiently close to the position of the requested view and include all the image parts of these images. It may then determine which depth transition metrics have already been transmitted for the identified image parts and transmit the rest together with the image part.

The synthesis selector 307 is arranged to select a first image part from a set of image parts. The first image part is selected for an image part/region of an image which is to be synthesized by the image synthesizer 303 for the rendering view pose (or one determined from this e.g. by prediction of a future rendering view pose by evaluation of a model, e.g. modelling the movement of a user).

Specifically, the synthesis of a synthesized image may be performed by synthesizing different image parts and then combining these parts. Thus, for a given image part of the synthesized image, the image synthesizer 303 may generate the output image by applying a view point shift to a received anchor image part received from the image data stream generating apparatus 103. This may be repeated for all image parts of the synthesis image to generate a complete image. However, due to the image part based synthesis, there may be some inconsistencies at the borders between different image parts. In many embodiments, these inconsistencies are sufficiently small to not cause unacceptable artifacts and degradation. Further, in many embodiments, the image synthesizer 303 may be arranged to perform post-processing to mitigate such inconsistencies. For example, depth adjustments may be applied to meshes around the image part edges to generate a consistent depth map on which the textures may be overlaid. As another example, the synthesized image parts may be blended together at the edges to provide a smooth transition with no strong inconsistencies.

The synthesis selector 307 may for a given image part of the synthesized image be arranged to select the anchor viewpoint that should be used for the synthesis of that image part of the synthesized image (this will also be referred to as the synthesis image part). Thus, for a given synthesis image part, the synthesis selector 307 is arranged to select which image part should be used as the reference/anchor image part from which to perform the view shift. The image part may be selected from all the available image parts including from anchor images that are not necessarily the ones having an anchor pose closest to the rendering view pose.

Accordingly, the selector 205 will typically be arranged to select from a set of anchor image parts, an anchor view pose/image part for an image section of an image (an image part) to be synthesized by the image synthesizer 303. The set of anchor image parts may specifically be those that correspond to the synthesis image part and specifically those which represent the same region of the scene. Typically, the same segmentation is used for the synthesized image and for the anchor images, and for the rendering view pose being close to the anchor poses, the corresponding image parts are simply the image parts having the same position in their respective image.

The selector may be arranged to select a first image part as the image part for the synthesis of the synthesis image part by applying a decision criterion which includes a consideration of the depth transition metrics for the anchor image parts. The selection criterion may include other considerations and may typically also consider the difference in view pose between the rendering view pose and the anchor poses for the anchor image parts.

In many embodiments, the rendering view pose may be used to select a candidate set of anchor image parts between which the selector 205 may select the first image part based on the depth transition metric. For example, a candidate set of anchor image parts may be determined by selecting the corresponding anchor image parts in the two nearest anchor images in opposite directions. For example, the nearest anchor image to the left and right of the rendering view pose may be selected, and the image parts in these two images that are at the same image position as the synthesis image part will be selected as candidates.

The directions may be image plane directions and specifically may be image plane directions in the image plane (or a parallel plane) of the image part/the image of the image part. The direction of a front to back depth transition of an image part may be a direction in the image plane of a transition from a more foreground object/area/pixel to a more backgroung object/area/pixel. The direction from a view pose for the image part to the rendering view pose may be a direction in the image plane of the image part/image. It may be a direction from a projection of the view pose to the image plane along a direction orthogonal to the image plane to a projection of the rendering view pose to the image plane along a direction orthogonal to the image plane.

In other embodiments, anchor images or image parts for which the anchor pose meets a given proximity requirement (e.g. a Euclidian distance being below a threshold) may be selected as belonging to the candidate set.

The selector 205 may then evaluate the depth transition metrics of the candidate image parts to select an image part.

The synthesis selector 307 may specifically select the first image part depending on the direction of the depth transition. In particular, the synthesis selector 307 may be arranged to select an anchor image part for which the main/dominant depth transition from front to back occurs in a direction which is opposite of the direction of the required viewpoint shift over an anchor image part for which the main/dominant depth transition from front to back occurs in a direction which is in the same direction as the required viewpoint shift. For example, if two candidate anchor image parts comprise a dominant depth transition from a foreground object to background with the background being to the right of the foreground object, the depth transition from front to back will be in a direction towards the right. If a first candidate anchor image parts is for an anchor pose to the left of the rendering view pose and a second candidate anchor image part is for an anchor pose to the right of the rendering view pose, the selector 205 will select the second candidate anchor view pose over the first candidate.

In many embodiments, a more gradual approach is used. For example, a cost measure may be determined for a number of anchor image parts (e.g. all image parts within a given distance of the rendering view pose) which is dependent on a plurality of parameters including the depth transition metric. For example, a cost measure may be determined which increases with an increasing distance between the rendering view pose and the anchor pose for the image part and which also decreases as a function of the alignment between a vector from the rendering view pose to the anchor pose and the direction of the dominant depth transition as represented by the depth transition metric. The synthesis selector 307 may then select the anchor pose for which the cost measure is minimized.

In some such embodiments, the size of the depth transition may also be considered. For example, the higher the depth transition size, the higher the cost function. As another example, the depth transition size exceeding a threshold may increase the cost function by a fixed value.

The selector may specifically bias selection of the first image part towards an image part for which a front to back depth transition of the depth transition is in a direction that is opposite to a direction from a view pose for the image part to the rendering view pose. As described above, the bias may specifically be by selecting only an image part for which the two directions are sufficiently opposite to each other (e.g. with an angle between them of more than e.g. 90°, 120°, or 150°).

The selector may accordingly consider two directions, e.g. with those both being in the image plane of the image parts/image. The directions may e.g. be represented by vectors.

One direction is the direction of the step from front to back, i.e. the direction in which the step is from foreground towards background. This direction may for example be from left to right for the image part, e.g. the direction of the largest transition from foreground to background may be from the left to the right. As a specific example, the left side of the image part may be a foreground object (e.g. part of a trunk of a tree) whereas the right side may be background (e.g. the sky). For such an example, the direction of the step from front to back is thus a left to right direction, i.e. the front to back depth transition of the depth transition is in a direction from left to right.

The selector may further consider a second direction which is from the view pose for the image part (i.e. the anchor pose of the image part) to the rendering view pose. For example, the rendering view pose may be offset to the right of the anchor pose for the image part in which case the direction is a left to right direction, or it may be offset to the left of the anchor pose in which case the direction is in a right to left direction.

The selector may bias the selection based on the relationship between these two directions. Specifically, it will bias selection which is towards an image part for which these directions are opposite to each other. The bias may for example be introduced by the cost function considering the relative directions and increasing the cost value for an increasing aligment between the directions (decreasing angle between the directions).

The bias may be dependent on a degree of correlation/ alginment between the directions in the image plane.

It will be appreciated that directions and points in the image plane need not explicitly be calculated or determined in order to perform the bias.

Such an approach reflects the inventor's realisation that when the two directions are opposite, the main depth transition will result in more occlusion occurring when shifting to the rendering view pose and thus in less de-occlusion operation being necessary whereas when the two directions are in the same direction, the main depth transition will result in less occlusion (and thus more de-occlusion of the background) occurring when shifting to the rendering view pose, and thus in more de-occlusion operation being necessary.

Thus, the specific selection bias may provide a specific selection bias that provides a substantial advantage in practical implementations.

The synthesis selector 307 thus selects a first image part to use for synthesizing a specific image part of an image to be synthesized for the rendering view pose. The selection may be fed to the image synthesizer 303 which then proceeds to perform the synthesis based on the selected anchor image part. In case the selected anchor image part has already been received and previously stored, the image synthesizer 303 may retrieve the image part and use it for synthesis.

In the image synthesis apparatus 101 of FIG. 3, the selection is also fed to the retriever 309 which proceeds to request the selected anchor image from the image data stream generating apparatus 103. This retrieval may in many embodiments be arranged to be dependent on whether the image part has already been received or not, i.e. the retriever 309 may first evaluate whether a suitable anchor image part has been received and is always stored, and if not it may request the image part from the image data stream generating apparatus 103.

It will be appreciated that there may be a delay in the selected anchor image part being provided by the image data stream generating apparatus 103 to the image synthesis apparatus 101 and that the image synthesis apparatus 101 may compensate for such delays in different ways. For example, the synthesis selector 307 may perform the selection based on a predicted rendering view pose generated from the user input. As another example, a delay may be introduced to the rendering view pose used for the synthesis compared to the requested rendering view pose to accommodate for the transmission delay.

The described approach may in particular provide a practical streaming playback using an image part/tile-based transmission and rendering of image data with associated depth (such as depth maps and/or meshes). For a given user's view-direction and a given 3D scene's depth distribution, the system may seek to prioritize the transmission of image parts (e.g. pre-defined tiles) such that the image parts that have the biggest effect on image quality are transmitted first (with a higher priority) and tiles that have less effect on image quality are transmitted later.

The described approach utilizes depth transition metrics in determining which image part(s) should be transmitted next, and thus in the prioritization and sequencing of the transmission of image parts. The approach may for example use a pre-calculated depth step size and direction as a depth transition metric which is transmitted and stored as metadata. This data may then be used to evaluate which image part should be transmitted from the image data stream generating apparatus 103 to the image synthesis apparatus 101.

The Inventor has realized that the approach may provide improved performance and in particular that it may reduce or mitigate error or artefacts that may occur due to de-occlusion resulting from the view point shift.

Figure 4:
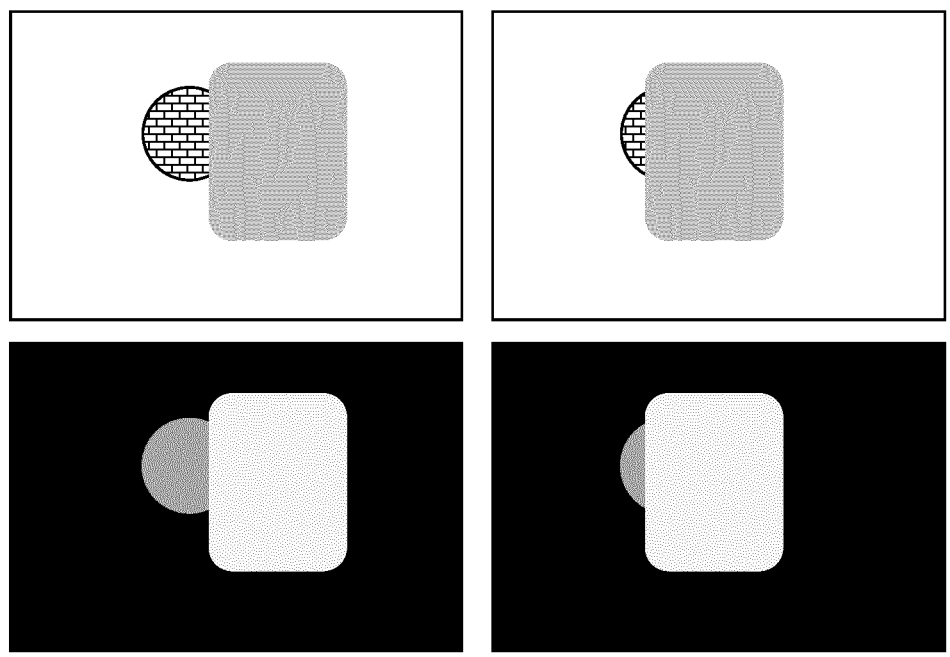
FIG. 4 illustrates an example of reference/anchor images and associated depth maps.

The issue may be illustrated by considering the situation of FIG. 4 which shows a left- and a right-eye image with associated depth maps below. The depth map coding is such that white represents close to the camera and black represents far away from the camera. The example shows a foreground object in front of a background object. It is for simplicity assumed that the background is merely a constant white background which can be ignored in the following description.

An intermediate view-point can be synthesized either from the left image with the associated depth map or from the right image with associated depth map using depth image based rendering. As an alternative, the depth maps may be converted to a mesh and standard graphics texture mapping may be used to synthesize an intermediate view-point (using either the left or right image as reference).

Figure 5:
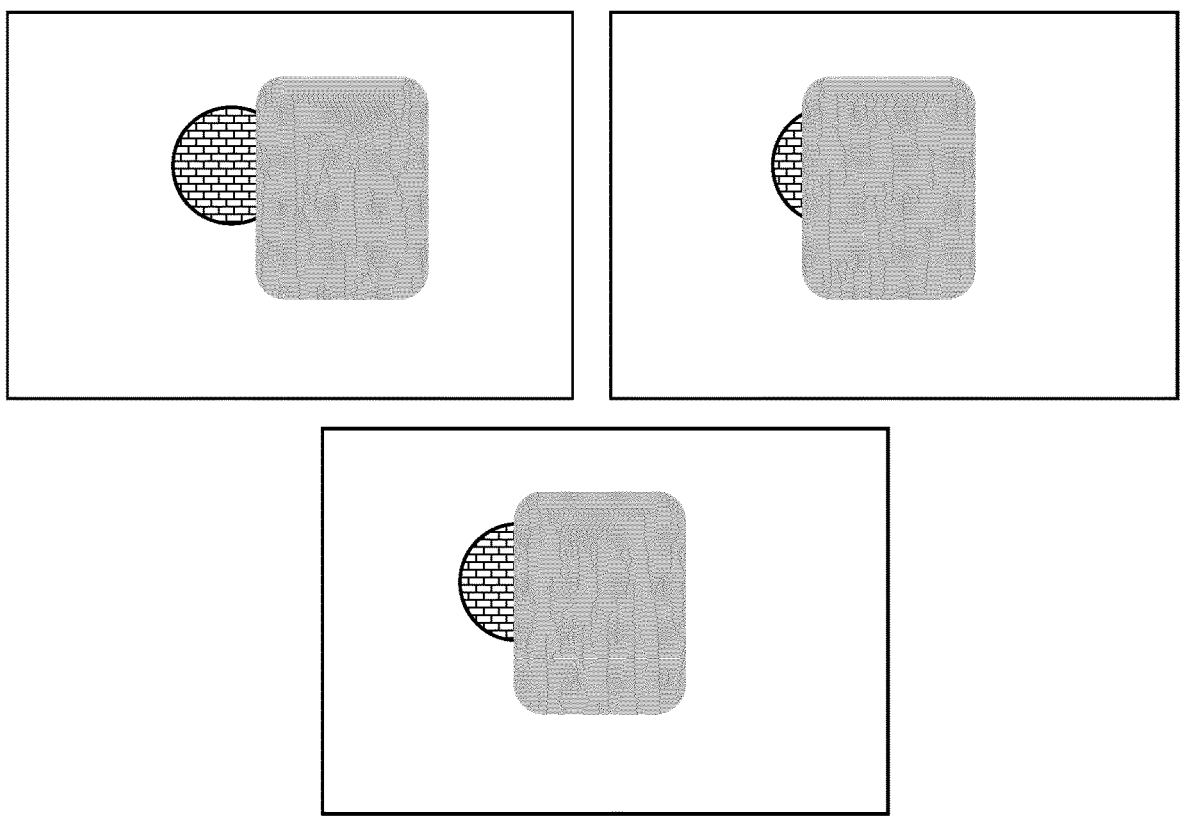
FIG. 5 illustrates an example of reference/anchor images and a synthesized image.

In this example, if the intermediate view-point is synthesized using the left image, then the information of the patterned background object is preserved as illustrated in FIG. 5. This is the case because the single depth step edge between the foreground object and the background object present in the image is oriented such that no additional de-occlusion arises and only covering/occlusion results from the relative parallax shifts of the two objects when performing the view shift from the left image.

Figure 6:
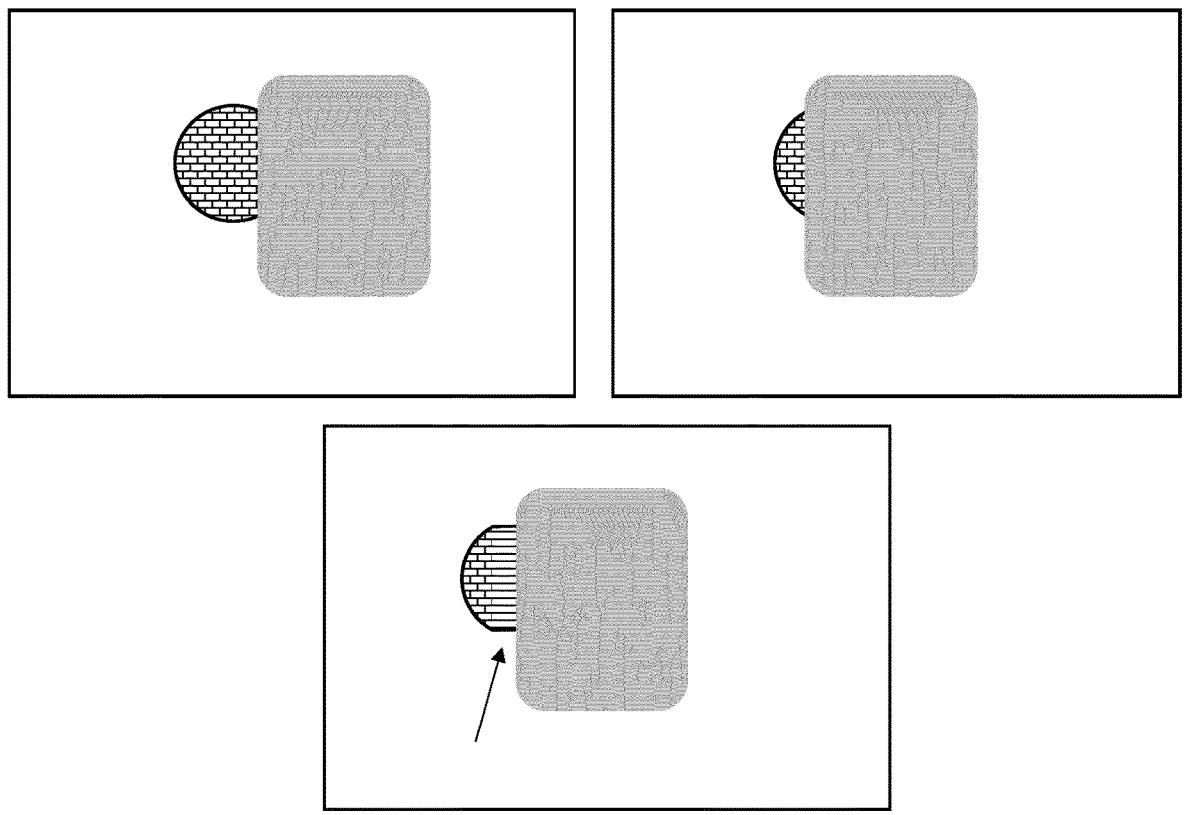
FIG. 6 illustrates an example of reference/anchor images and a synthesized image.

However, if the intermediate view-point is synthesized using the right image then the background object is partially de-occluded as illustrated in FIG. 6. This is the case because the single depth step edge present in the image results in de-occlusion when the parallax shift is performed relative to the left image. In this example, the intermediate view-point is synthesized with errors/artefacts since 'uncovering' or de-occlusion of the background object occurs when rendering the intermediate view-point from the right image. The local background object is either 'stretched' or holes are formed depending on the specific rendering method that is used.

Figure 7:
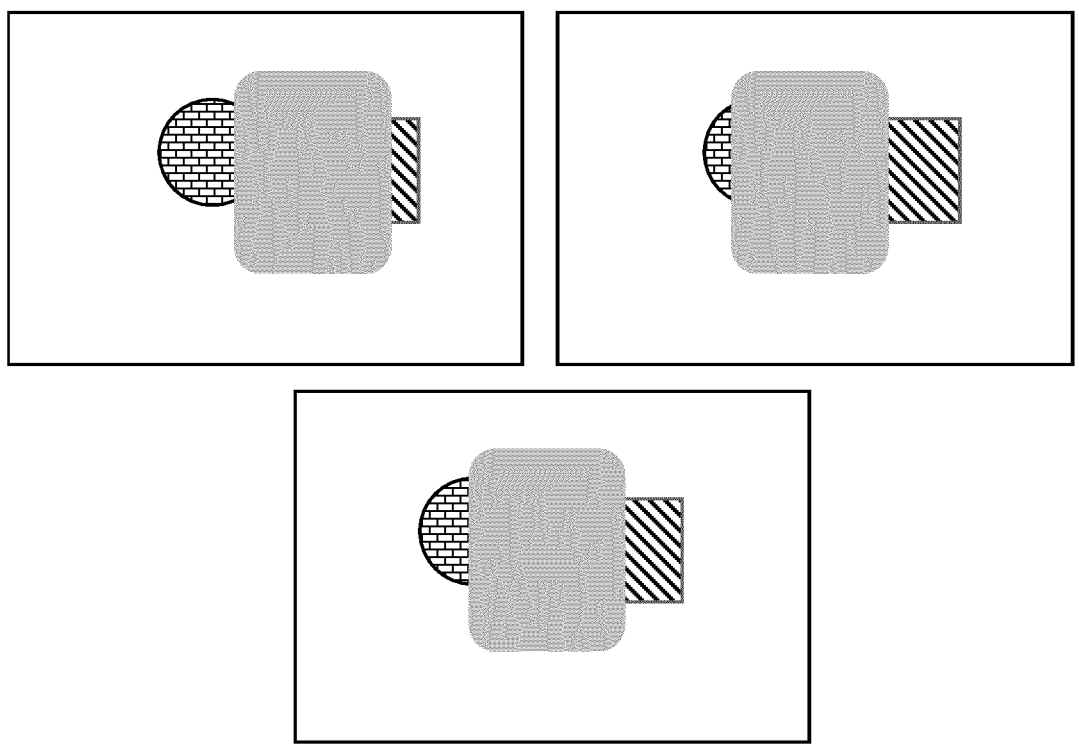
FIG. 7 illustrates an example of reference/anchor images and a synthesized image.

FIGS. 5 and 6 illustrate that correct view-synthesis can be achieved from a single view-point when there is a single depth step present in the image and this has a known orientation. However, in general there will be multiple objects present in the image and therefore many depth steps will be present with differing depth step directions. This is illustrated in FIG. 7 where the example of FIGS. 4-6 are extended with a third object which is positioned behind the foreground object. In this case, de-occlusion will occur both if the left reference/anchor view is used and if the right reference/anchor view image is used. Thus, in the example where the image now contains two depth steps in opposite directions (the step from front towards the back is respectively in the left and right direction for the two background objects). The intermediate view image cannot be synthesized correctly using either the left or the right image as de-occlusion will occur in both cases.

However, in the described approach where image part based synthesis is performed, this may be achieved and the use of the depth transition metric to select which image parts are present and used for the synthesis may address the issue.

Figure 8:
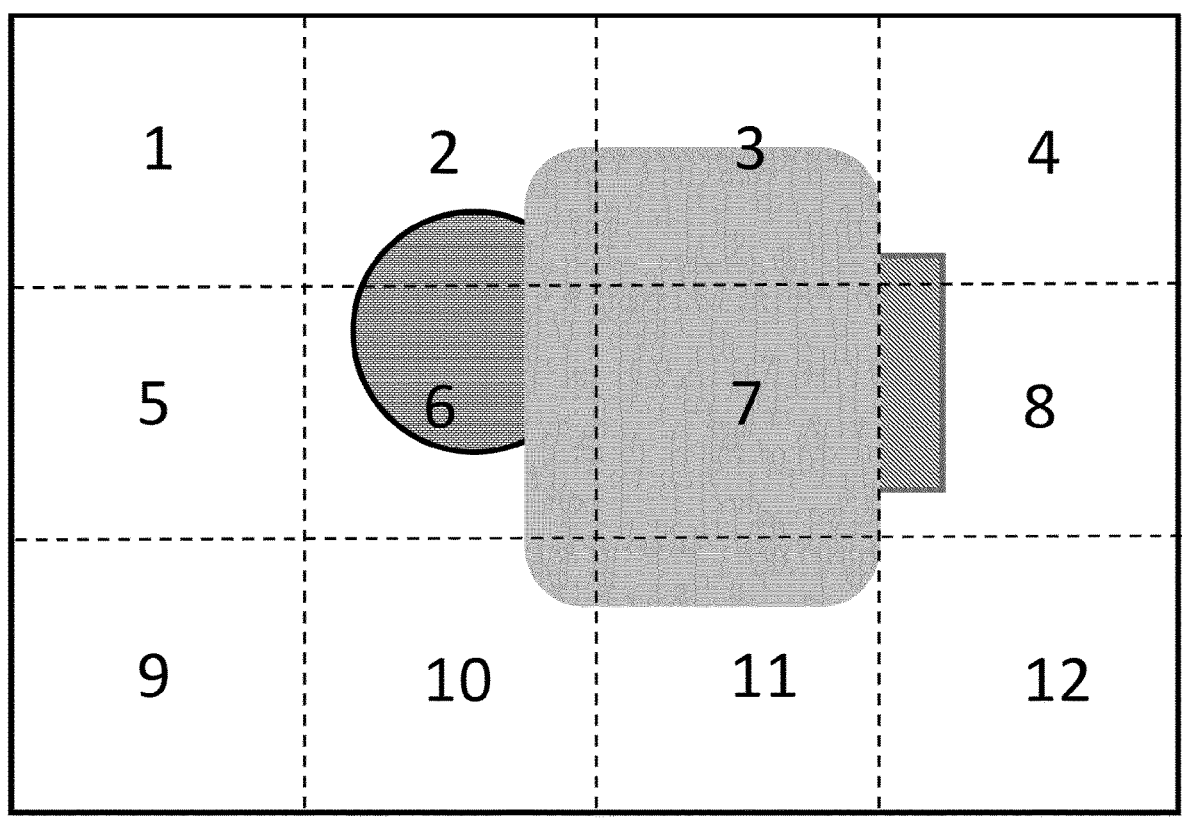
FIG. 8 illustrates an example of a synthesized image.

This may be illustrated by the example of FIG. 8 in which the images of FIG. 7 are each represented by 12 image parts/tiles. Each tile corresponds to a possibly overlapping region of the image. A first advantage of the tiling is that it can reduce the amount of data that needs to be transmitted as it is possible to select only parts of the image that are close to the rendering view pose and for which a small view-point shift needs an image update. Tiles containing less 3D complexity and tiles that lie further away from the rendering view pose may have less update priority since they may be rendered at acceptable quality using a different view-point (that was already present at the client side).

Figure 9:
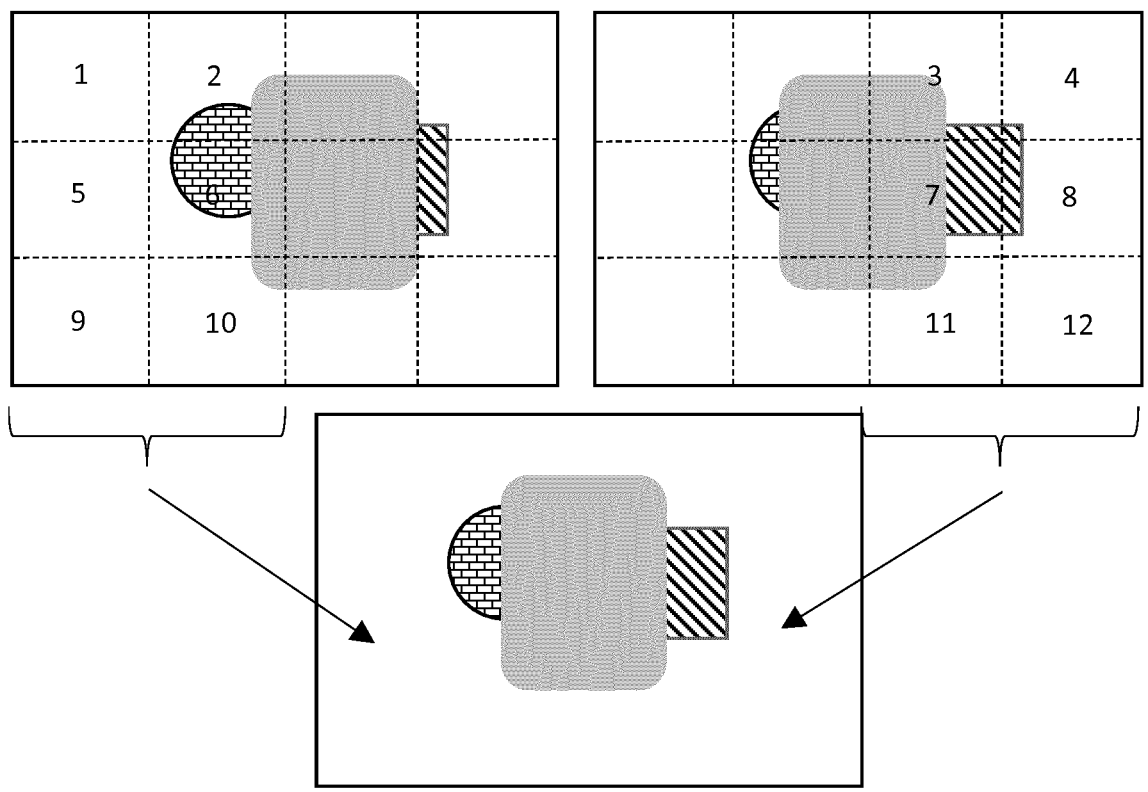
FIG. 9 illustrates an example of reference/anchor images and a synthesized image.

Thus, tiling has advantages for streaming six-degree-of-freedom (6DoF) images as it may allow a more flexible and granular provision of image data. However, in addition, the Inventor has realized that it may address occlusion problems by selecting tiles during playback depending on the rendering view pose (and thus in the example the user's position and movement) and a depth transition metric. Given the tiling structure as shown in FIG. 8, an intermediate viewpoint for a more complex scene can now be composed using a combination of tiles from different reference/anchor viewpoints where the selection of the tile depends on the direction (and possibly the size) of the dominating depth transition in the tile as previously described. An exemplary tile based synthesis for the example of FIG. 8 is illustrated in FIG. 9. The approach may in particular improve de-occlusion performance as it reduces the amount of conflicting depth transitions, and thus de-occlusion, for the selection of which anchor image/image part to use for the view shift operation.

As a very specific example of the approach, the image synthesis apparatus 101 may during 6DoF play-back per tile select the best reference anchor tile from a set of nearby reference anchor tiles using the following steps:

1. Determine the set of N reference anchor image parts/tiles i for which the anchor position $p_i$ lies closest to the current rendering view pose $p_{viewer}$;
2. Read the meta-data containing depth transition metrics reflecting a dominant depth gradient vector for each reference view point i;
3. For each tile, select the anchor tile for which a cost function based on the depth transition metrics is minimized.

A suitable depth transition metric may be a dominant depth gradient vector and a suitable cost function may be the reciprocal of the inner product of the dominant depth gradient vector and the projection (onto the reference view plane) of the vector connecting the reference view position and the viewer position.

E.g. let $q_i = p_{viewer} - p_i$ be the vector connecting the position of anchor/reference view pose i and the rendering view pose. Let $d_{ij}$ be the direction vector that points from a nearby anchor pose $p_i$ to the centre of tile j. Note that this direction vector can be calculated from the location of the tile in the full image and the specific projection that was used to create the anchor images (e.g. perspective or equirectangular). Let plane P be the plane that lies orthogonal to $d_{ij}$. We can now determine the component of $q_i$ that lies in plane P and which is per definition orthogonal to view direction vector $d_{ij}$. Let $q_{ij}^{(orthogonal)}$ denote this component. The selected reference view point i for tile j should now maximize the inner product over all nearby view points i (corresponding to minimizing the cost function being the reciprocal of the inner product):

$$\max_i (q_{ij}^{(orthogonal)} \cdot g_{ij})$$

If vectors $q_{ij}^{(orthogonal)}$ and $g_{ij}$ have the same direction, then the viewer is positioned such relative to the reference view i that covering/occlusion occurs at the occlusion/depth step. Hence the maximum of the inner product as given above is a useful decision metric.

The previous examples have focused on an example where the decision of which image part to select was performed at the image synthesis apparatus 101, and specifically an approach with an "intelligent" image synthesis apparatus 101 and a "dumb" image data stream generating apparatus 103 were implemented.

However, in some embodiments, the decision algorithm may e.g. be performed in the image data stream generating apparatus 103. For example, the image synthesis apparatus 101 may be arranged to directly transmit the rendering view pose to the image data stream generating apparatus 103. The image data stream generating apparatus 103 may locally store the generated depth transition metric data and the process described with reference to the synthesis selector 307 may instead be performed by the selector 205. The selected anchor image part may then be transmitted to the image synthesis apparatus 101, e.g. with an indication of which image part of which synthesized image should be synthesized based on the received anchor image part.

In such embodiments, no complex selection needs to be performed by the image synthesis apparatus 101 and no depth transition metric data needs to be received and stored. Rather, the image synthesis apparatus 101 may simply receive the anchor image parts and perform the instructed synthesis. Thus, such an approach may allow a low complexity image synthesis apparatus 101 to be implemented.

In some embodiments, the image parts may correspond to a predetermined partitioning of the images. For example, as in the example of FIGS. 8 and 9, a rectangular image may be divided into a predetermined plurality of square tiles with each square corresponding to an individually selectable image part.

Such an approach may allow a low complexity implementation which however may still provide excellent performance.

In some embodiments, the image parts (or at least some image parts) may be faces of polyhedral projections of the scene for different view poses, such as for example squares in a cube map or the triangles in an icosahedron.

Specifically, for a given view point, the hemispherical view may be divided into a set of corresponding planar polygons that together form a hemispherical geometric construction. This will in many embodiments facilitate the view synthesis operations and furthermore will facilitate integrating new image parts being received with previously received or predicted image parts. Compared to equirectangular projection, and due to polyhedral projections having flat faces, it is cheaper to render an image on a standard GPU because a low number of triangles can accurately describe the shape that is associated with the projection. For polyhedral projections with sufficient number of faces (like the icosahedral projection) the average projection distortion is lower than for equirectangular projection. Furthermore, the faces provide a natural partitioning of the image.

In some embodiments, the image data stream generating apparatus 103 may comprise a partitioner which is arranged to generate at least some image parts by partitioning anchor images. In some embodiments, this partitioning may be predetermined, e.g. the partitioner may partition the image using a regular tiling.

However, in many embodiments, more freely shaped partitions or segments may be generated, and in particular the generation of image parts may be by a segmentation which depends on the properties of the image and/or depth map. This may for example allow specific objects to be represented by different image parts, the background by another individual image part etc.

It will be appreciated that any suitable approach for image segmentation may be used without detracting from the invention. For example, segments may be generated to have consistent colors and/or intensities, or to correspond to recognized object images such as faces, or e.g. segments may be generated to correspond to areas having similar depth values etc. It will be appreciated that a large number of segmentation algorithms and criteria will be known to the skilled person.

In some embodiments, at least some image parts are overlapping.

In many embodiments, it may be beneficial to allow for overlapping image parts such that two adjacent image parts both include image data for an overlapping border region. This may result in an increased storage demand and may increase the data rate of the bitstream. However, in many embodiments, it may allow for an improved coding efficiency (e.g. if the coding blocks do not align with borders between image parts). Furthermore, the overlapping regions may substantially facilitate the blending of a new image part with other image parts that e.g. may have been previously generated at the image synthesis apparatus 101.

Although the previous description has focused on a representation using standard images and depth maps, it will be appreciated that in other embodiments other approaches may be used.

For example, the images may comprise texture atlas images that include texture parts from mesh and texture representations of the scene. An example of such a representation may e.g. be found in A. Collet et al. High-quality streamable free-viewpoint video. ACM Transactions on Graphics (TOG), Proceedings of ACM SIGGRAPH 2015. Volume 34 Issue 4, August 2015.

In such an example, an anchor image may correspond to a texture atlas that is most suitable for viewing from the anchor position (region). A texture atlas combined with a (disjoint) mesh may form a geometrical model of an object or scene. In this case, an image part may for instance be one texture in such an atlas that corresponds to one surface in a scene.

In some embodiments, the image parts (or at least some of them) may be pre-encoded. Thus, they may be encoded and stored in a format wherein they can be directly included in the bitstream without any requirement for transcoding or (re)encoding. Rather, an image part that is to be included in the bitstream may simply be retrieved from a store and added to the bitstream with no encoding operation. This may very substantially reduce the complexity and resource requirements at the image data stream generating apparatus 103 and provide for very efficient operation.

In some embodiments, the depth transition metric may be determined based on the depth data for the image parts. However, the principles and approaches described are not limited to any specific relationship between the depth data for the image parts, such as e.g. that received and used for the synthesis, and the depth transition metric. It is also noted that it is by no means a technical necessity or even practical requirement that any specific relationship exist between the depth data and the depth transition metric, or that the depth transition metric is generated in any specific way.

In practice, the depth transition metric may in many embodiments be generated by evaluating and processing the depth data for the image parts. Further, this may indeed in many embodiments be performed by the synthesis apparatus based on the received depth data. However, in many other practical embodiments, the depth transition metric may be determined e.g. at the image source. For example, a server may generate the depth transition metric and simply provide this to the synthesis apparatus independently of the depth data. The server may in such embodiments generate the depth transition metric based on the depth data, but this is not necessary and indeed it may be possible to generate the depth transition metric without any consideration of the generated depth data. For example, it may be determined based on analysis of the image part (e.g. an image may be analysed to determine a dominant background colour (e.g. the colour covering the largest area) with an image part then being analysed to identify an area of this colour. If this area is adjacent to the side of the image part, then a direction of depth transition can be determined based on whether this side is the left side or the right side). Indeed, in some embodiments, the depth transition metric could be manually entered by an operator. Thus, in many embodiments, the depth transition metric for an image part may be determined fully independently of the depth data for the image part. No technical difficulties will arise from this and the preferred approach depends entirely on the requirements and preferences for the individual embodiment.

It will also be appreciated that the synthesized image(s) can be used in any suitable way and this is merely down to the preferences of which context to apply the described principles in. In many typical applications, it may indeed be displayed directly thereby generating e.g. a personal VR experience. However, in other embodiments, it may e.g. be stored in a suitable storage or streamed to a potentially large group of people etc. Indeed, the synthesized image may be used as any other image as appropriate and desired.

It is also noted that the described selection concept can be implemented on the client side, on the server side, or indeed distributed across.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

In accordance with some embodiments, there may be provided:

1. An image synthesis apparatus, the image synthesis apparatus comprising:
a receiver (301) for receiving image parts and associated depth data of images representing a scene from different view poses from an image source;
a determiner(305) for determining a rendering view pose;
a store (311) comprising a depth transition metric for each image part of a set of image parts, the depth transition metric for an image part being indicative of a direction of a depth transition in the image part;
an image synthesizer (303) for synthesizing at least one image from received image parts;
a selector for selecting a first image part of the set of image parts in response to the depth transition metric; and
a retriever (309) for retrieving the first image part from the image source.

2. The image synthesis apparatus of the above wherein the depth transition metric is indicative of a size of the depth transition.

3. The image synthesis apparatus of any of the above wherein the selector (307) is arranged to further select the first image part in response to differences between a view pose of the image parts of the set of image parts and the rendering view pose.

4. The image synthesis apparatus of 3 above wherein the selector (307) is arranged to determine the set of image parts subject to a constraint that a difference between the view pose of any image part belonging to the set of image parts and the rendering view pose is below a threshold.

5. The image synthesis apparatus of any of the above wherein the selector (307) is arranged to select the first image part as an image part for an image section of an image to be synthesized by the image synthesizer; and to determine the set of image parts as image parts for the image region from different view poses.

6. The image synthesis apparatus of any of the above wherein the set of image parts comprises image parts from different view poses and corresponding to a same part of an image to be synthesized.

7. The image synthesis apparatus of any of the above wherein the selector (307) is arranged to bias selection of the first image part towards an image part for which a front to back depth transition of the depth transition is in a direction that is opposite to a direction from a view pose for the image part to the rendering view pose.

8. The image synthesis apparatus of any of the above wherein the synthesis of the at least one image comprises synthesizing an image part of the at least one image from the first image part.

9. The image synthesis apparatus of any of the above wherein the depth transition metric represents an average of depth gradients exceeding a threshold.

10. An apparatus for generating an image data stream, the apparatus comprising:
a receiver (203) for receiving an image part request from a remote source;
a store (201) for storing a set of image parts and associated depth data of images representing a scene from different view poses;
a metric generator (203) for providing a depth transition metric for each image part of the set of image parts, the depth transition metric for an image part being indicative of a direction of a depth transition in the image part;
a selector (205) for selecting image parts from the set of image parts in response to the image part request; and
a transmitter (207) for transmitting selected image parts and associated depth to the remote source.

11. The apparatus of 10 above wherein the transmitter (207) is arranged to transmit the depth transition metrics for the set of image parts to the remote source.

12. The apparatus of 10 or 11 above wherein the image part request comprises a view pose indication, and the selector (205) is arranged to select image parts in response to the depth transition metrics and the view pose indication.

13. A method of synthesizing an image, the method comprising:
receiving image parts and associated depth data of images representing a scene from different view poses from an image source;
determining a rendering view pose;
a storing a depth transition metric for each image part of a set of image parts, the depth transition metric for an image part being indicative of a direction of a depth transition in the image part;
synthesizing at least one image from received image parts;
selecting a first image part of the set of image parts in response to the depth transition metric; and
retrieving the first image part from the image source.

14. A method of generating an image data stream, the method comprising:
receiving an image part request from a remote source;
storing a set of image parts and associated depth data of images representing a scene from different view poses;
providing a depth transition metric for each image part of the set of image parts, the depth transition metric for an image part being indicative of a direction of a depth transition in the image part;
selecting image parts from the set of image parts in response to the image part request; and
transmitting selected image parts and associated depth to the remote source.

The invention claimed is:

1. An image synthesis apparatus, comprising:
a receiver circuit,
wherein the receiver circuit is arranged to receive image parts and associated depth data from an image source,
wherein the image parts are parts of images,
wherein the images represent a scene from different view poses;
a determiner circuit, wherein the determiner circuit is arranged to determine a rendering view pose;
a memory circuit, wherein the memory circuit is arranged to store a depth transition metric for each image part of a set of the image parts,
wherein the set of image parts is a portion of the image parts,
wherein the depth transition metric for an image part is indicative of a direction of a depth transition within each image part;
a selector circuit, wherein the selector circuit is arrange to select a first image part of the set of image parts, wherein the first image part has a first depth transition metric, wherein the selection of the first image part is in response to the rendering view pose and the first depth transition metric; and
a retriever circuit, wherein the retriever circuit is arrange to retrieve the first image part from the image source;
an image synthesizer circuit, wherein the image synthesizer circuit is arranged to synthesize at least one image from the image parts including the first image part.

2. The image synthesis apparatus of claim 1, wherein the depth transition metric is indicative of a size of the depth transition within the corresponding image part.

3. The image synthesis apparatus of claim 1, wherein the selector circuit is arranged to select the first image part in response to differences between a view pose of the image parts of the set of image parts and the rendering view pose.

4. The image synthesis apparatus of claim 3,
wherein the selector circuit is arranged to determine the set of image parts subject to a constraint,
wherein the constraint is a difference between the view pose of any image part belonging to the set of image parts and the rendering view pose is below a threshold.

5. The image synthesis apparatus of claim 1,
wherein the selector circuit is arranged to determine the set of image parts as image parts based on the restriction that the set of image parts represent a region of the scene,
wherein the region of the scene is an image section of the at least one image to be synthesized by the image synthesizer circuit,
wherein the image parts of the set of image parts represents the image region from different view poses.

6. The image synthesis apparatus of claim 1,
wherein the set of image parts comprises image parts from different view poses,
wherein the set of image parts correspond to a part of an image to be synthesized.

7. The image synthesis apparatus of claim 1, wherein the selector circuit is arranged to bias selection of the first image part towards an image part for which a front to back depth transition of the depth transition is in a direction that is opposite to a direction from a view pose for the image part to the rendering view pose.

8. The image synthesis apparatus of claim 1, wherein the synthesis of the at least one image comprises synthesizing an image part of the at least one image from the first image part.

9. The image synthesis apparatus of claim 1, wherein the depth transition metric represents an average of depth gradients exceeding a threshold.

10. An apparatus for generating an image data stream, the apparatus comprising:
a receiver circuit, wherein the receiver circuit is arranged to receive an image part request from a remote source;
a memory circuit,
wherein the memory circuit is arranged to store a set of image parts and associated depth data,
wherein the image parts are parts of images,
wherein the parts of images represent a scene from different view poses; a metric generator circuit,
wherein the metric generator circuit provides a depth transition metric for each image part of the set of image parts,
wherein the depth transition metric for an image part is indicative of a direction of a depth transition within the image part;
a selector circuit, wherein the selector circuit is arranged to select image parts from the set of image parts in response to the image part request and the depth transition metrics; and
a transmitter circuit, wherein the transmitter circuit is arranged to transmit selected image parts and associated depth to the remote source.

11. The apparatus of claim 10, wherein the transmitter is arranged to transmit the depth transition metrics for the set of image parts to the remote source.

12. The apparatus of claim 10,
wherein the image part request comprises a view pose indication,
wherein the selector circuit is arranged to select image parts in response to the depth transition metrics and the view pose indication.

13. A method of synthesizing an image, comprising:
receiving image parts and associated depth data from an image source,
wherein the image parts are parts of images,
wherein the parts of images represent a scene from different view poses;
determining a rendering view pose;
storing a depth transition metric for each image part of a set of image parts, wherein the depth transition metric for an image part is indicative of a direction of a depth transition within the image part;
selecting a first image part of the set of image parts in response to the rendering view pose and the depth transition metric;
retrieving the first image part from the image source; and
synthesizing at least one image from the image parts, wherein the image parts comprise the first image part.

14. A method of generating an image data stream, comprising:
receiving an image part request from a remote source;
storing a set of image parts and associated depth data,
wherein the image parts are parts of images representing a scene from different view poses;
providing a depth transition metric for each image part of the set of image parts, wherein the depth transition metric for an image part is indicative of a direction of a depth transition within the image part;
selecting image parts from the set of image parts in response to the image part request and the depth transition metrics; and
transmitting selected image parts and associated depth data to the remote source.

15. A computer program stored on a non-transitory medium, wherein the computer program when executed on a processor performs the method as claimed in claim 13.

16. A computer program stored on a non-transitory medium, wherein the computer program when executed on a processor performs the method as claimed in claim 14.

17. The method of claim 13, wherein the depth transition metric is indicative of a size of the depth transition within the corresponding image part.

18. The method of claim 13, further comprising selecting the first image part in response to differences between a view pose of the image parts of the set of image parts and the rendering view pose.

19. The method of claim 14, wherein the depth transition metric is indicative of a size of the depth transition within the corresponding image part.

20. The method of claim 14, further comprising selecting the first image part in response to differences between a view pose of the image parts of the set of image parts and the rendering view pose.

* * * * *